United States Patent
Carrasco et al.

(10) Patent No.: US 10,446,021 B2
(45) Date of Patent: Oct. 15, 2019

(54) ONBOARD TRAFFIC AND PEDESTRIAN WARNING SYSTEMS AND METHODS HAVING OPTICAL AND AUDIO SIGNAL FEEDBACK AND CONTROL

(71) Applicant: TRANSOFT SOLUTIONS INC., Richmond (CA)

(72) Inventors: Milton Carrasco, Richmond (CA); Steven Kin Shing Cheng, Vancouver (CA); Steven Chi Kit Chan, Coquitlam (CA)

(73) Assignee: mOasis Inc., Union City, CA (US)

( * ) Notice: Subject to any disclaimer, the term of this patent is extended or adjusted under 35 U.S.C. 154(b) by 195 days.

(21) Appl. No.: 15/327,514

(22) PCT Filed: Jul. 22, 2015

(86) PCT No.: PCT/CA2015/050690
§ 371 (c)(1),
(2) Date: Jan. 19, 2017

(87) PCT Pub. No.: WO2016/011557
PCT Pub. Date: Jan. 28, 2016

(65) Prior Publication Data
US 2017/0169703 A1     Jun. 15, 2017

Related U.S. Application Data

(60) Provisional application No. 62/029,369, filed on Jul. 25, 2014.

(51) Int. Cl.
*B60Q 1/00* (2006.01)
*G08G 1/005* (2006.01)
(Continued)

(52) U.S. Cl.
CPC ............... *G08G 1/005* (2013.01); *B60Q 1/46* (2013.01); *B60Q 1/525* (2013.01); *B60Q 5/006* (2013.01);
(Continued)

(58) Field of Classification Search
CPC .................................. G08B 1/00; B60Q 1/00
See application file for complete search history.

(56) References Cited

U.S. PATENT DOCUMENTS

| 2006/0114125 A1 | 6/2006 | Kubota et al. |
| 2007/0088488 A1* | 4/2007 | Reeves ................. G07C 5/085 701/117 |

(Continued)

FOREIGN PATENT DOCUMENTS

| DE | 102009009472 | 8/2010 |
| DE | 102009009473 | 8/2010 |

(Continued)

OTHER PUBLICATIONS

International Search Report for PCT/CA2015/050690.
(Continued)

*Primary Examiner* — Shirley Lu
(74) *Attorney, Agent, or Firm* — Palmer IP Inc.

(57) ABSTRACT

Warning systems (S) and methods (M1, M2) for alerting traffic and pedestrians within a projectable area in relation to a location and path of a vehicle (100), e.g., an articulated vehicle during forward or rearward motions and turning maneuvers. Beam(s) (98) of coherent light, e.g., high-irradiance laser light, are emitted from point(s) relative to the vehicle (100), preferably from a high angle for reducing eye exposure. Laser beam(s) map a grid on the roadway and adjacent areas of the imminent path of the turning vehicle (100), by way of a set of instructions executable by a processor. The instructions involve computing, program-
(Continued)

ming, and/or updating vehicle parameters, in relation to a warning device (99), e.g., a retrofittable and/or programmable device, in response to changes in vehicle-configuration or warning system (S) location, the warning system (S) being manually or automatically triggerable in response to sensors disposed in relation to the vehicle (100).

20 Claims, 6 Drawing Sheets (51) Int. Cl.
*B60Q 1/52* (2006.01)
*B60Q 5/00* (2006.01)
*G08G 1/16* (2006.01)
*B60Q 1/46* (2006.01)
*B60R 1/00* (2006.01)

(52) U.S. Cl.
CPC ............... *B60R 1/00* (2013.01); *G08G 1/166* (2013.01); *B60Q 2400/50* (2013.01); *B60R 2300/301* (2013.01); *B60R 2300/8033* (2013.01); *B60R 2300/8086* (2013.01); *B60R 2300/8093* (2013.01); *B60Y 2200/145* (2013.01); *B60Y 2200/148* (2013.01); *B60Y 2200/30* (2013.01)

(56) References Cited

U.S. PATENT DOCUMENTS

| | | | |
|---|---|---|---|
| 2013/0154815 A1* | 6/2013 | Min | B60Q 1/085 340/425.5 |
| 2014/0172239 A1 | 6/2014 | Vergara et al. | |
| 2015/0203026 A1* | 7/2015 | Schotanus | B60Q 1/24 362/520 |

FOREIGN PATENT DOCUMENTS

| | | |
|---|---|---|
| DE | 102011075758 | 11/2012 |
| JP | 2005161977 | 6/2005 |

OTHER PUBLICATIONS

Written Opinion for PCT/CA2015/050690.
Extended European Search Report for EP 15824103.4 (Corresponding EP application).

* cited by examiner

ONBOARD TRAFFIC AND PEDESTRIAN WARNING SYSTEMS AND METHODS HAVING OPTICAL AND AUDIO SIGNAL FEEDBACK AND CONTROL

CROSS-REFERENCE TO RELATED APPLICATION(S)

The present document is a PCT Application claiming the benefit of, and priority to, U.S. Provisional Patent Application Ser. No. 62/029,369, filed on Jul. 25, 2014, also entitled "ONBOARD TRAFFIC AND PEDESTRIAN WARNING SYSTEMS AND METHODS HAVING OPTICAL AND AUDIO SIGNAL FEEDBACK AND CONTROL", which is hereby incorporated by reference in its entirety for all purposes.

TECHNICAL FIELD

The present disclosure technically relates to traffic warning systems and methods for road users and pedestrians. More specifically, the present disclosure technically relates to traffic and pedestrian warning systems and methods for use in relation to a forward, rearward, or turning path of a vehicle. Even more specifically, the present disclosure technically relates to traffic and pedestrian warning systems and methods having optical and/or audio feedback and/or control input for use in relation to a forward, rearward, or turning, path of a vehicle in order to warn road users and pedestrians, and/or vehicle operators/drivers and to permit active and/or passive vehicle guidance control input.

BACKGROUND

Many related art technologies are currently utilized for traffic control in general. These related art technologies usually involve a sensor and a warning device, such as a sound-emitting device as found in backup warning systems. Other related are systems include camera technologies for reversing passenger vehicles, i.e., a calibrated camera (regular/infrared) for showing the extents to which a vehicle backing and for indicating back-up turning using lighted "whiskers," e.g., in the BMW™ 535i™ vehicle. Other related art technologies involve a device, using a "mass" detection feature, which sends a warning signal to a driver regarding a potential conflict with the cyclist disposed in a blind spot. Another related art technology involves a flashlight device for projecting a "bike-shaped" image on the pavement at night as a warning. A further related art technology detects an animal crossing ahead and would warn a driver.

For instance, U.S. Patent Application Publication No. 2006/0114125 to Kubota of Aisin AW Co., Ltd. (hereinafter "Aisin") discloses a proximity warning apparatus, method, and program involving a vehicle and having sensors disposed on the vehicle for detecting surrounding objects or vehicle parameters, rotatable laser beam generator disposed on the vehicle for emitting and projecting laser beam(s) onto objects in the environment surrounding the vehicle, a data storage unit disposed on the vehicle for storing data about surrounding objects or vehicle parameters, a controller disposed on the vehicle for controlling the laser beam generator based on a signal from the sensor, and a display unit, such as a monitor, for providing information to the vehicle operator by displaying images on a screen, and a display unit, such as a monitor, for providing information to the vehicle operator by displaying images on a screen. However, Kubota does not disclose predicting a pathway of a vehicle in relation an instantaneous disposition of the vehicle in advance of the vehicle's travel, especially for forward or rearward travel and a turning manoeuvre or providing advance warning corresponding to the predicted pathway, among other features.

Also, U.S. Patent Application Publication No. 2013/0154815 to Min of Hyundai Motor Company (hereinafter "Hyundai"), discloses a system and method of providing a warning to vulnerable road users, including pedestrians, cyclists, skateboarders, persons on scooters, other non-vehicular traffic, and animals which are adjacent to the road, using a laser beam involving a vehicle and having sensor(s) disposed on the vehicle for detecting information and data about surrounding objects or vehicle parameters, a rotatable laser beam generator disposed on the vehicle for emitting and projecting laser beam(s) onto objects in the environment surrounding the vehicle, and a controller disposed on the vehicle for controlling the laser lights based on a signal from the sensor. However, Hyundai does not disclose: a data storage unit, a display unit, predicting a pathway of a vehicle in relation an instantaneous disposition of the vehicle in advance of the vehicle's travel, especially for forward or rearward travel and a turning manoeuvre, or providing advance warning corresponding to the predicted pathway, among other features.

In addition, European Patent Publication No. 0072567 to FMC Corporation (hereinafter "FMC") discloses a boundary plane blocking system having a vehicle, sensor(s) disposed on the vehicle for detecting information and data about surrounding objects or vehicle parameters, and a rotatable laser beam generator for emitting and projecting laser beam(s) onto objects in the environment surrounding the vehicle (e.g. a roadway). However, FMC does not disclose: the rotatable laser beam generator is disposed on the vehicle, a data storage unit disposed on the vehicle for storing data about surrounding objects or vehicle parameters, a controller disposed on the vehicle for controlling the laser lights based on a signal from the sensor, or a display unit, such as a monitor, for providing information to the vehicle operator by displaying images on a screen, predicting a pathway of a vehicle in relation an instantaneous disposition of the vehicle in advance of the vehicle's travel, especially for forward or rearward travel and a turning manoeuvre, or providing advance warning corresponding to the predicted pathway.

While these background examples may relate to warning technologies in general, they fail to disclose a system or a method adapted for use with a vehicle, such as an articulating vehicle, that is capable of predicting a pathway of such vehicle in relation an instantaneous disposition of the vehicle in advance of the vehicle's travel, especially for forward or rearward travel and a turning manoeuvre, or providing adequate advance warning corresponding to the predicted pathway, among other features. Related art self-guided vehicle technology has not been known to be adapted for use with multi-part vehicles or even for managing steering to provide an ideal turn path. As such, a long-felt need has been experienced in the related art for a system and method that overcomes the inability provide sufficient warning to traffic and pedestrians regarding the forward or rearward, or turning motion of vehicles, such as articulating vehicles.

SUMMARY

In addressing many of the problems experienced in the related art, such as limited backup warnings, embodiments according to the present disclosure generally involves warning systems and methods for alerting at least one of traffic, vulnerable road users, i.e. pedestrians, cyclists, skateboarders, persons on scooters, other non-vehicular traffic, and animals which are adjacent to the road, and a driver within a projectable area in relation to a location and path of a single or multi-unit vehicle or any vehicle, such as during a forward or reverse motion and during a turning manoeuvre, particularly a turning manoeuvre performed by a long wheelbase single or multi-unit vehicle or articulating vehicle, such as a tractor-trailer, a multi-segment bus, a train, a subterranean train, an elevated train, a tram, a vehicle towing a trailer, a vehicle towing another vehicle, articulating mining vehicles, or a series of nesting shopping carts, e.g., for supermarket parking lot applications. In one embodiment of the present disclosure, the presently disclosed warning systems and methods are beneficial for use with one or more of land vehicles, aircraft, spacecraft, and watercraft. Systems and methods according to one or more embodiments of the present disclosure are particularly beneficial for any articulating vehicle and offer many benefits by predicting a pathway of the vehicle in relation an instantaneous disposition of the vehicle in advance of the vehicle's travel, especially for forward or rearward travel and a turning manoeuvre and by providing ample advance warning corresponding to the predicted pathway, among other features. Many fleet vehicles would benefit from an installation or a retrofit of the onboard warning systems according to one or more embodiments of the present disclosure, such as to desirably assist in avoiding collisions and derailments.

Encompassed by embodiments of the present disclosure are systems and methods involving a projected beam or beams of coherent light, for example high irradiance laser light, is emitted from a point or multiple points in relation to the vehicle, preferably from a high angle, in order to reduce eye exposure of drivers, riders or pedestrians. In one such embodiment, the laser beam(s) map a grid on the roadway and adjacent areas of the imminent path of the turning vehicle, by way of a set of instructions executable by a processor. In particular, systems and methods according to an embodiment of the present disclosure contemplate the use of at least one of: LIDAR, photogrammetry and stereo-photogrammetry techniques for remote sensing that measure distance to a target. In a particular embodiment using LIDAR, distance to a target may be measured by illuminating a target with a beam of light emission, with a laser beam for example, and analyzing the reflected light for at least generating a high-resolution map.

Contemplated by one embodiment of the present disclosure is the use of LIDAR techniques for imaging the environment around a vehicle by employing light in at least one wavelength range of an ultraviolet spectrum, a visible spectrum, and a near-infrared spectrum, wherein a narrow laser-beam facilitates mapping environmental features at a very high resolution. One embodiment of the presently disclosed systems and methods involve adjusting a wavelength range to suit a given environmental feature (either detected or reported). In one such embodiment, the incident laser beam is generally reflected via backscattering, such as Rayleigh scattering, Mie scattering, Raman scattering, or fluorescence, wherein the employed light comprises at least one wavelength, for facilitating mapping, and even remote mapping, of environmental features as well as environmental conditions by identifying at least one wavelength-dependent change in an intensity of a returned signal from the backscatter, wherein the employed light is adjustable by varying the at least one wavelength on the basis of the at least one wavelength-dependent change. In other embodiments, other suitable distance measuring techniques may be applied such as photogrammetry or stereo-photogrammetry, for example.

In one embodiment, a set of instructions are based on an algorithm that is capable of computing the vehicle parameters, such as a wheelbase length, articulation points, and other structural characteristics. In one such embodiment, the parameters and/or characteristics are programmable, e.g., factory programmable, in relation to a device, such as a programmable logic controller (PLC), or are automatically updateable, manually updateable, or retrofittable in response to changes in the vehicle configuration or to relocation of the warning system from one vehicle to another vehicle. The warning system may be triggered either manually or automatically in response to feedback from sensors disposed in relation to the vehicle, the sensors detecting information, such as acceleration data and control input data related to turning characteristics.

An embodiment of the present disclosure generally involves a warning system, comprising: at least one sensor disposable in relation to a vehicle and capable of detecting information relating to at least one vehicle parameter and at least one object within a projectable area; at least one rotatable optical and audio signal generator disposable in relation to the vehicle and capable of emitting and projecting at least one optical and audio signal in relation to the at least one object within the projectable area; and a processor and/or controller disposable in relation to the vehicle and capable of receiving feedback from the at least one sensor and of instructing the at least one rotatable optical and audio signal generator based on the feedback while the vehicle is in motion. The audio signal may comprise a range of frequencies including those not detectable by humans in order to warn and or scare away animals, and the audio signal may vary in a warbling or other manner including variations in decibel strength, in order to project sound into a warning area relating to the path of the vehicle. The warning system further comprises a display device communicable with the controller for providing user-friendly feedback to the driver, the display device comprising a graphic user interface (GUI).

A further embodiment of the present disclosure generally involves a method of fabricating a warning system, comprising: providing at least one sensor disposable in relation to a vehicle and capable of detecting information relating to at least one vehicle parameter and at least one object within a projectable area; providing at least one rotatable optical and/or audio signal generator disposable in relation to the vehicle and capable of emitting and projecting at least one optical and/or audio signal in relation to the at least one object within the projectable area; and providing a controller disposable in relation to the vehicle and capable of receiving feedback from the at least one sensor and of instructing the at least one rotatable optical and/or audio signal generator based on the feedback while the vehicle is in motion. In one such embodiment, the method of fabricating a warning system further comprises providing a display device communicable with the controller for providing user-friendly feedback to the driver such as including warning, active or passive guidance control feedback, the display device providing comprising providing a graphic user interface (GUI).

Yet a further embodiment of the present disclosure generally involves a method of warning at least one of traffic, a pedestrian, and a driver by way of a warning system, comprising: providing a warning system, the warning system providing comprising: providing at least one sensor disposable in relation to a vehicle and capable of detecting information relating to at least one vehicle parameter and at least one object within a projectable area; providing at least one rotatable optical and/or audio signal generator disposable in relation to the vehicle and capable of emitting and projecting at least one optical and/or audio signal in relation to the at least one object within the projectable area; and providing a processor and/or controller disposable in relation to the vehicle and capable of receiving feedback from the at least one sensor and of instructing the at least one rotatable optical and audio signal generator based on the feedback while the vehicle is in motion; and activating the warning system.

In one embodiment, the warning system providing further comprises providing a display device communicable with the controller for providing user-friendly feedback to the driver, the display device providing comprising providing a graphic user interface (GUI). The warning system method further comprises providing user-friendly feedback to the driver by way of the display device. In one such embodiment, the user-friendly feedback provided to the driver may comprise warnings, or active or passive guidance control feedback Benefits of the systems and methods according to embodiments of the present disclosure include, but are not limited to, improving awareness of vulnerable road users (i.e. pedestrians, cyclists, etc.), particularly in urban and high non-vehicular traffic areas, providing a warning capability that reduces the number and severity of turning manoeuvre accidents, reducing in property damage in non-urban areas, reducing the number and severity of forward or rearward motion accidents, reducing the number and severity of smaller turning radius or decreasing turning radius accidents, reducing off-tracking or derailments, reducing oversteering, and providing positive feedback and guidance to the driver for facilitating execution of a safe and efficient manoeuvre.

BRIEF DESCRIPTION OF THE DRAWING(S)

The above, and other, aspects, features, and advantages of several embodiments of the present disclosure will be more apparent from the following Detailed Description as presented in conjunction with the following several figures of the Drawing.

FIGS. 1A and 1B are schematic representations illustrating a plan view of an articulable vehicle, such as an inland freight vehicle in accordance with conventional methods in the related art. As depicted in FIG. 1A, the articulable vehicle comprises a tractor-trailer configuration having a coupling structure, the trailer articulating in relation to the tractor, as typically occurring in operation of the vehicle, especially during a turning manoeuvre, wherein the trailer rear wheels path is not coincident with the general path of the tractor front wheels and the tractor rear wheels, thereby presenting a potentially dangerous situation where the trailer rear wheels may pass unacceptably close to an obstacle or pedestrian or other vehicle, in accordance with a conventional method in the related art. As depicted in FIG. 1B, the articulable vehicle similarly comprises a tractor-trailer configuration where the trailer articulates in relation to the tractor such as during a turning manoeuvre, wherein the trailer rear wheels path is not coincident with the general path of the tractor front wheels and the tractor rear wheels, thereby presenting a dangerous situation where an obstacle or pedestrian or other vehicle may be struck by the trailer rear wheels, in accordance with a conventional method in the related art.

FIG. 3 is a schematic representation illustrating a plan view of an articulable vehicle, such as an inland freight vehicle, according to an embodiment of the present disclosure. As depicted in FIG. 3, the articulable vehicle comprises a tractor-trailer configuration having a coupling structure, the trailer articulating in relation to the tractor, as typically occurring in operation of the vehicle, especially during a turning manoeuvre, wherein the trailer rear wheels path is not coincident with the general path of the tractor front wheels and the tractor rear wheels, and the articulating vehicle implementing a warning system operable with a warning method, whereby a dangerous condition is avoidable, in accordance with an embodiment of the present disclosure.

FIG. 4 is a schematic representation illustrating a perspective view of an articulable vehicle, such as an inland freight vehicle, according to an embodiment of the present disclosure. As depicted in FIG. 4, the articulable vehicle comprises a tractor-trailer configuration having a hitching structure, the trailer articulating in relation to the tractor, as typically occurring in operation of the vehicle, especially during a turning manoeuvre, wherein a path of the trailer front wheels and trailer rear wheels is not coincident with the general path of the tractor front wheels and the tractor rear wheels, the articulating vehicle implementing a warning system operable with a warning method, whereby a dangerous condition is avoidable, in accordance with an embodiment of the present disclosure.

Corresponding reference characters indicate corresponding components throughout the several figures of the Drawing. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, well-understood elements that are useful or necessary in a commercially feasible embodiment are often not depicted in order to facilitate a less obstructed view of these various embodiments of the present disclosure.

DETAILED DESCRIPTION

The following description is not to be taken in a limiting sense, but is made merely for the purpose of describing the general principles of exemplary embodiments. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

Further, the described features, structures, or characteristics of the present disclosure may be combined in any suitable manner in one or more embodiments. In this Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure.

In one embodiment, the present disclosure involves a warning system, comprising: at least one sensor disposable in relation to a vehicle and capable of detecting information relating to at least one vehicle parameter and at least one object within a projectable area; at least one rotatable signal generator, such as an optical and/or audio signal generator, disposable in relation to the vehicle and capable of emitting and projecting at least one signal, such as an optical and/or audio signal, in relation to the at least one object within the projectable area; and a controller disposable in relation to the vehicle and capable of receiving feedback from the at least one sensor and of instructing the at least one rotatable signal generator based on the feedback while the vehicle is in motion. In one such embodiment, the controller is capable of predicting a pathway of a vehicle in relation to an instantaneous disposition of the vehicle in advance of the vehicle's travel. The controller may also be capable of predicting a pathway of a potential obstacle in relation to an instantaneous disposition of the potential obstacle in advance of the obstacle's travel, so as to provide advance warning, and desirably ample advance warning such as by projecting at least one advance warning signal. In one such embodiment, the at least one signal comprises at least one optical signal and at least one audio beam, wherein the at least one optical and audio beam comprises at least one of a laser signal and a radar signal. The at least one signal may also comprise an infrared beam which would be particularly useful for facilitating night time driving. In one embodiment, the warning system further comprises at least one display device communicable with the controller for providing user-friendly feedback to the driver of the vehicle, such as at least one display device comprising at least one graphic user interface (GUI).

In a further embodiment, the system comprises at least one of: at least one storage device disposable in relation to the vehicle and capable of storing the information relating to the at least one vehicle parameter and the at least one object within the projectable area; and at least one display device disposable in relation to the vehicle and capable of providing at least one portion of the information by way of displaying at least one image on a GUI, such as a display screen. The information comprises data relating to the at least one vehicle parameter and the at least one object within the projectable area, including calculations, such as mathematical and geometrical calculations. The calculations comprising at least one of data and images relating to a mapping of a three-dimensional environment surrounding the vehicle. The calculations are used to project a laser beam on the pathway for facilitating guidance of the driver. In another embodiment, at least one of active or passive guidance input may be provided to the driver such as by means of a display such as a heads up display, or by interface with a vehicle control system, for example. The warning system is adaptable for use with a single or multi-unit vehicle, wherein the single or multi-unit vehicle comprises at least one of a tractor-trailer, a multi-segment bus, a "streetcar," a train, a subterranean train, an elevated train, such as an "El," and a monorail train, a subterranean train, such as a "subway," a vehicle towing a trailer, and a vehicle towing another vehicle. In addition, the warning system may be employed with other types of vehicles such as electric buses with overhead cables, trams and trains, such as vehicles having a defined path, a wide or overhanging load, a rear-steered vehicle, such as an airplane pushback vehicle (also known as an airplane tug), or combinations thereof. Airplane pushback vehicles are often rear steering vehicles with unusual turning parameters.

Figure 1A:
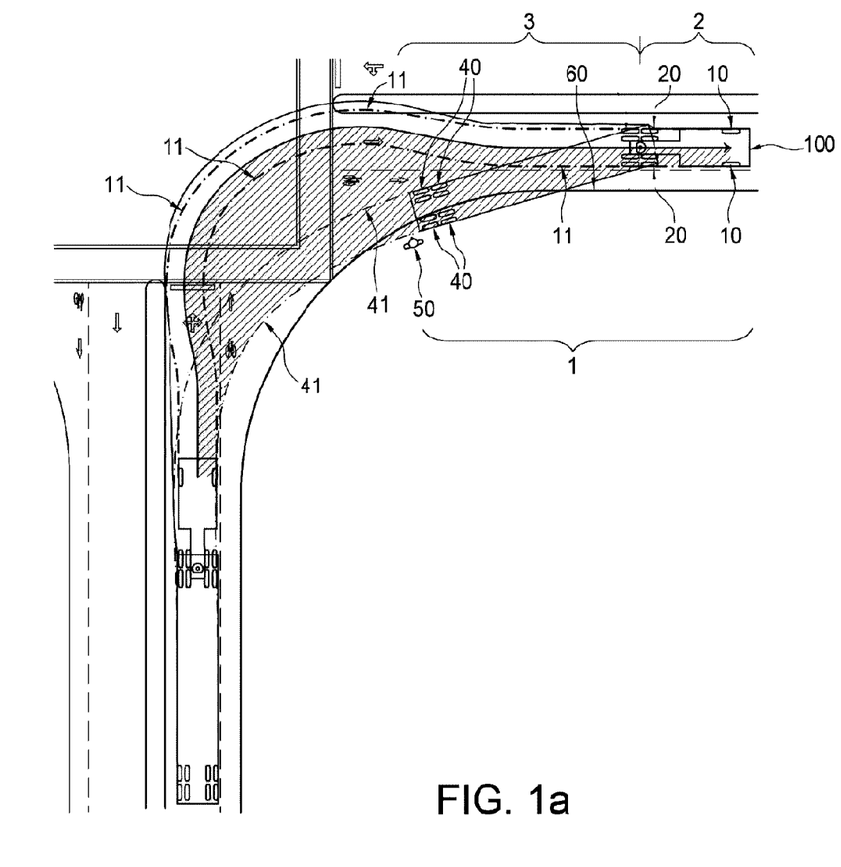
Figure 1B:
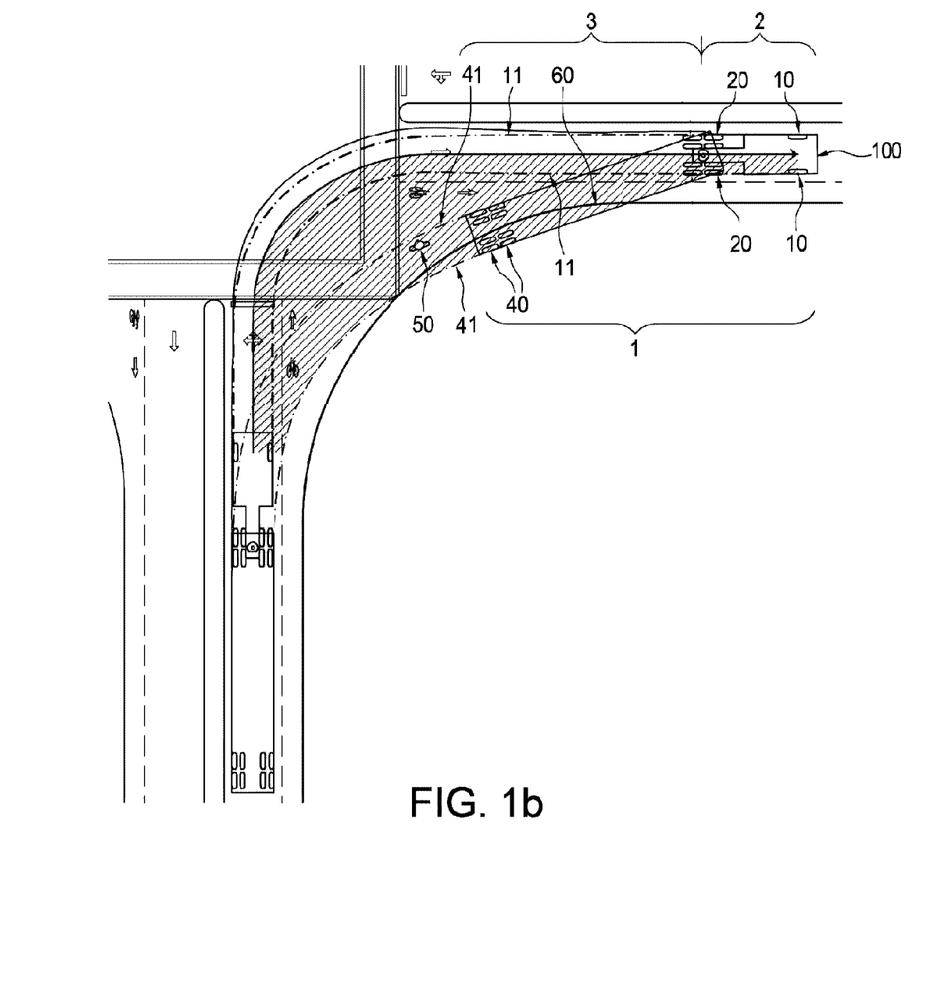

Referring now to FIGS. 1A and 1B, these are schematic representations illustrating a plan view of an articulable vehicle 100, such as an inland freight vehicle, in accordance with conventional methods in the related art. As depicted in FIG. 1A, the articulable vehicle comprises a tractor-trailer configuration 1 having a coupling structure (not shown) for disposing a trailer 3 in relation to the tractor 2, the tractor 2 of the tractor-trailer configuration 1 having a set of front wheels 10 and a set of rear wheels 20, the set of tractor front wheels 10 and the set of tractor rear wheels 20 generally having a path 11, and the trailer 3 of the tractor-trailer configuration 1 having a set of rear wheels 40, the set of trailer rear wheels 40 having a path 41, wherein the trailer rear wheels path 41 is not coincident with the general tractor front wheels and tractor rear wheels path 11, as occurring in operation of the vehicle 100, especially during a turning manoeuvre. In the conventional method of FIG. 1A, the trailer rear wheels 40 may pass unacceptably close to an obstacle, pedestrian or other vehicle 50, even where the path of the tractor 2 is directed wide of the turn to attempt to reduce oversteer of the trailer rear wheels 40. As depicted in FIG. 1B in accordance with a conventional method in the related art, the articulable vehicle 100 similarly comprises a tractor-trailer configuration where the trailer 3 articulates in relation to the tractor such as during a turning manoeuvre, wherein the trailer rear wheels path is not coincident with the general path of the tractor front wheels and the tractor rear wheels, thereby presenting a dangerous situation where an obstacle or pedestrian or other vehicle 50 may be struck by the trailer 3 or trailer rear wheels 40.

Still referring to FIGS. 1A and 1B, in such situations, a potentially conflicting obstacle 50, such as pedestrians and/or cyclists, may be present in an environment 60, such as an environment having a pavement, e.g., standing within a corner of a sidewalk where the rear trailer wheels 40 may pass unacceptably closely (as is shown in FIG. 1A) or stepping onto the roadway from a corner of a sidewalk where the obstacle 50 may be struck (as is shown in FIG. 1B), thereby both presenting dangerous situations which are known to exist in accordance with conventional methods in the related art. These conventional methods in the related art do not provide a technique for providing adequate advance warning in relation to obstacles.

Figure 2:
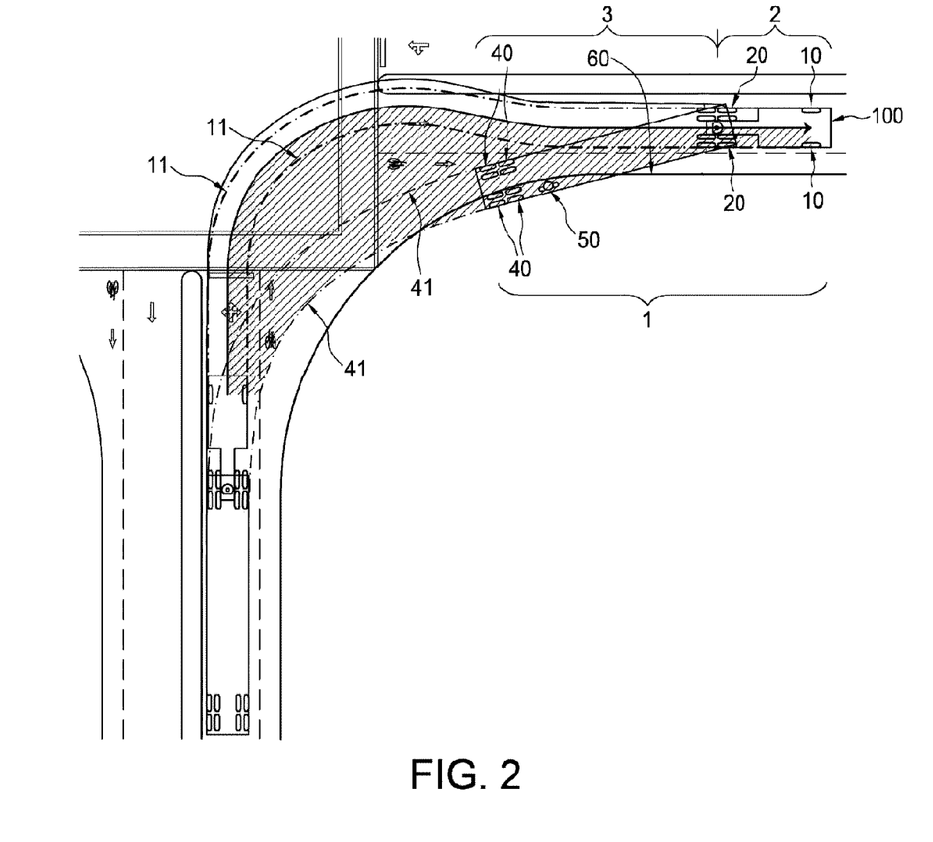
FIG. 2 is a schematic representation illustrating a plan view of an articulable vehicle, such as an inland freight vehicle in accordance with conventional methods in the related art. As depicted in FIG. 2, the articulable vehicle comprises a tractor-trailer configuration having a coupling structure, the trailer articulating in relation to the tractor, as typically occurring in operation of the vehicle, especially during a turning manoeuvre, wherein the trailer rear wheels path is not coincident with the general path of the tractor front wheels and the tractor rear wheels, thereby presenting a dangerous situation where an obstacle or pedestrian or other vehicle may be overrun by the rear trailer wheels, in accordance with a conventional method in the related art.

Referring now to FIG. 2, this schematic representation illustrates, in a plan view, an articulable vehicle 100, such as an inland freight vehicle, in accordance with a conventional method in the related art. As depicted in FIG. 2, the articulable vehicle 100 comprises a tractor-trailer configuration 1 having a coupling structure (not shown) for disposing a trailer 3 in relation to the tractor 2, the tractor 2 of the tractor-trailer configuration 1 having a set of front wheels 10 and a set of rear wheels 20, the set of tractor front wheels 10 and the set of tractor rear wheels 20 generally having a path 11, and the trailer 3 of the tractor-trailer configuration 1 having a set of rear wheels 40, the set of trailer rear wheels 40 having a path 41, wherein the trailer rear wheels path 41 is not coincident with the general tractor front wheels and tractor rear wheels path 11, as occurring in operation of the vehicle 100, especially during a turning manoeuvre, where an obstacle or pedestrian or other vehicle may be overrun by the rear trailer wheels, in accordance with a conventional method in the related art.

Still referring to FIG. 2, in one such situation, a potentially conflicting obstacle 50, such as pedestrians and/or cyclists, may be present in an environment 60, such as an environment having a pavement, e.g., around a corner of a sidewalk, e.g., in a blind-spot, thereby presenting a dangerous situation, where the rear wheels 40 of the trailer 3 may pass over the corner of the sidewalk for example, and may risk overrunning the conflicting obstacle 50. Likewise, in this situation, the conventional methods in the related art do not provide a technique for providing adequate advance warning in relation to obstacles. Likewise, in these situations, the conventional methods in the related art do not provide a technique for providing adequate advance warning in relation to obstacles. While some conventional systems in the related art warning systems merely sense an obstacle in a manner similar to that used in conventional garage door openers to calculate an immediate danger area D, this calculation is insufficient in relation to situations involving moving vehicles in combination with moving obstacles; and injury or death could still result as the pedestrian or animal would not have sufficient advance warning to alter his/its disposition.

Figure 3:
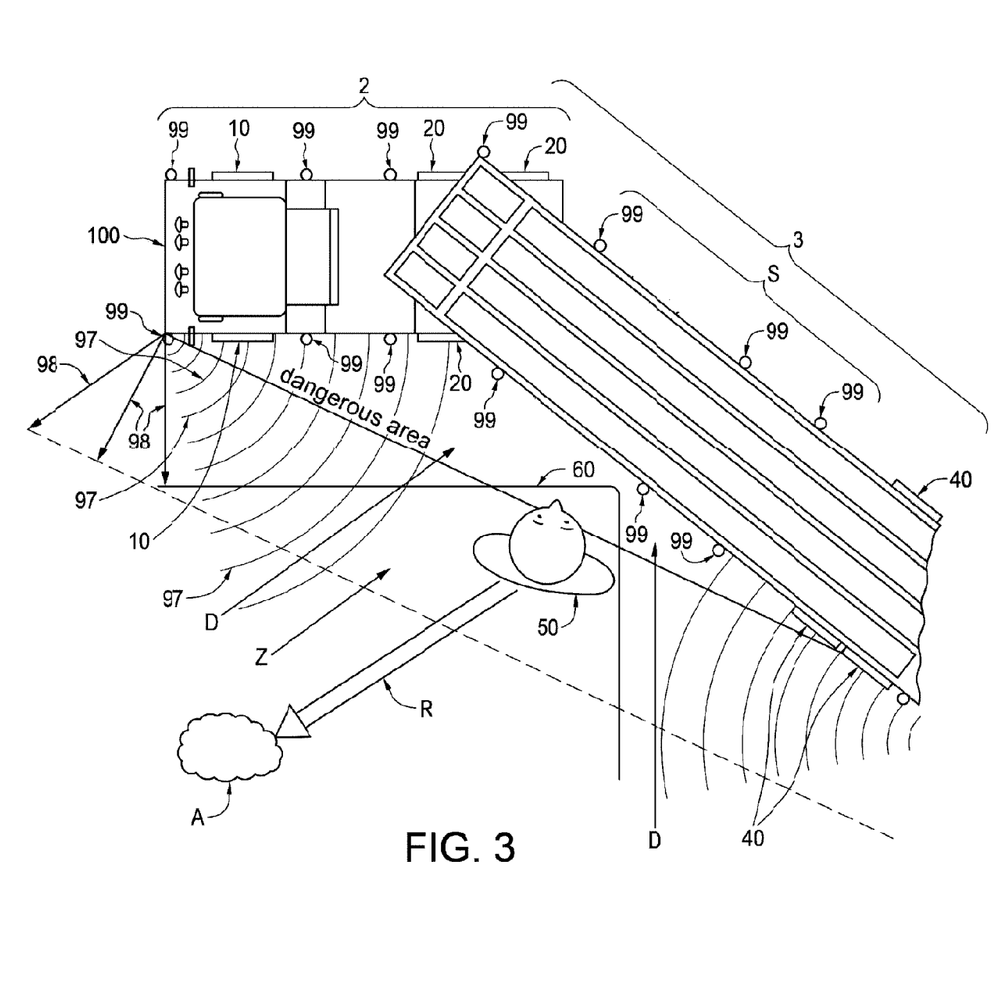

Referring now to FIG. 3, this schematic representation illustrates, in a plan view, an articulable vehicle 100, such as an inland freight vehicle, according to an embodiment of the present invention which advantageously comprises a warning system S. As depicted in FIG. 3, the articulable vehicle 100 comprises a tractor-trailer configuration 1 having a coupling structure (not shown) for disposing a trailer 3 in relation to the tractor 2, the tractor 2 of the tractor-trailer configuration 1 having a set of front wheels 10 and a set of rear wheels 20, the set of tractor front wheels 10 and the set of tractor rear wheels 20 generally having a path 11, and the trailer 3 of the tractor-trailer configuration 1 having a set of rear wheels 40, the set of trailer rear wheels 40 having a path 41, wherein the trailer rear wheels path 41 is not coincident with the general tractor front wheels and tractor rear wheels path 11, as occurring in operation of the vehicle 100, especially during a turning manoeuvre, the articulating vehicle 100 implementing a warning system S which is desirably operable with a corresponding warning method M2 (see also FIG. 6), whereby a dangerous condition may be desirably avoidable, in accordance with an embodiment of the present disclosure.

Still referring to FIG. 3, in such situations, a potentially conflicting obstacle 50, such as a vulnerable road user, including a pedestrian, a cyclist, a skateboarder, a person on a scooter, an individual traveling in other non-vehicular modes, or an animal which is adjacent to the road may be present in an environment 60, such as an environment having a pavement, e.g., a corner of a sidewalk. The warning system S comprises a plurality of warning devices 99 that are strategically disposed in relation to the vehicle 100 and/or any appurtenances thereof, wherein each warning device 99 comprises a light generator (not shown) for providing a visual alarm, especially during nightfall. In a further embodiment, the warning device 99 further comprises a sound generator (not shown) for providing an audible alarm. In one such embodiment, the light generator emits at least one light beam 98; and the sound generator emits at least one sound wave 97.

Still referring to FIG. 3, the presently disclosed warning systems and methods employ techniques and algorithms which overcome the limitations of conventional systems in the related art by predicting a pathway of the vehicle 100 in relation an instantaneous disposition of the vehicle 100 well in advance of its travel, especially for a forward or rearward travel and a turning manoeuvre, by predicting a pathway of a potential obstacle 50 in relation to an instantaneous disposition of the potential obstacle 50, e.g., a moving obstacle, such as another vehicle, a pedestrian, and an animal, and/or a stationary obstacle such as a ground clearance obstacle under the vehicle 100, or an overhead clearance height or overhanging structural obstacle, and by providing advance warning corresponding to the predicted pathway of the vehicle 100 and/or the predicted pathway of the potential obstacle 50, among providing other features and performing other functions. By providing ample and advance warning extending into a potentially dangerous zone Z well beyond an immediate danger area D, the potential obstacle 50 has ample time to alter his/its disposition, such as by running in a direction R to a safe location A.

Still referring to FIG. 3, in one embodiment, the warning system S comprises at least one of a processor, a controller, a factory programmed device, e.g., a programmable logic controller (PLC), a storage device, and a display device, for automatically or manually updating requirements in response to changes in configuration of the vehicle. Alternatively, the warning system may comprise a portable system for installing or retrofitting in relation to on any vehicle, wherein calibration or recalibration may be required. In a further embodiment, this warning system could be permanently fixed to the vehicle and preprogrammed for the specific vehicle or be installed as a temporary device and calibrated/reset for the temporary setup.

Figure 4:
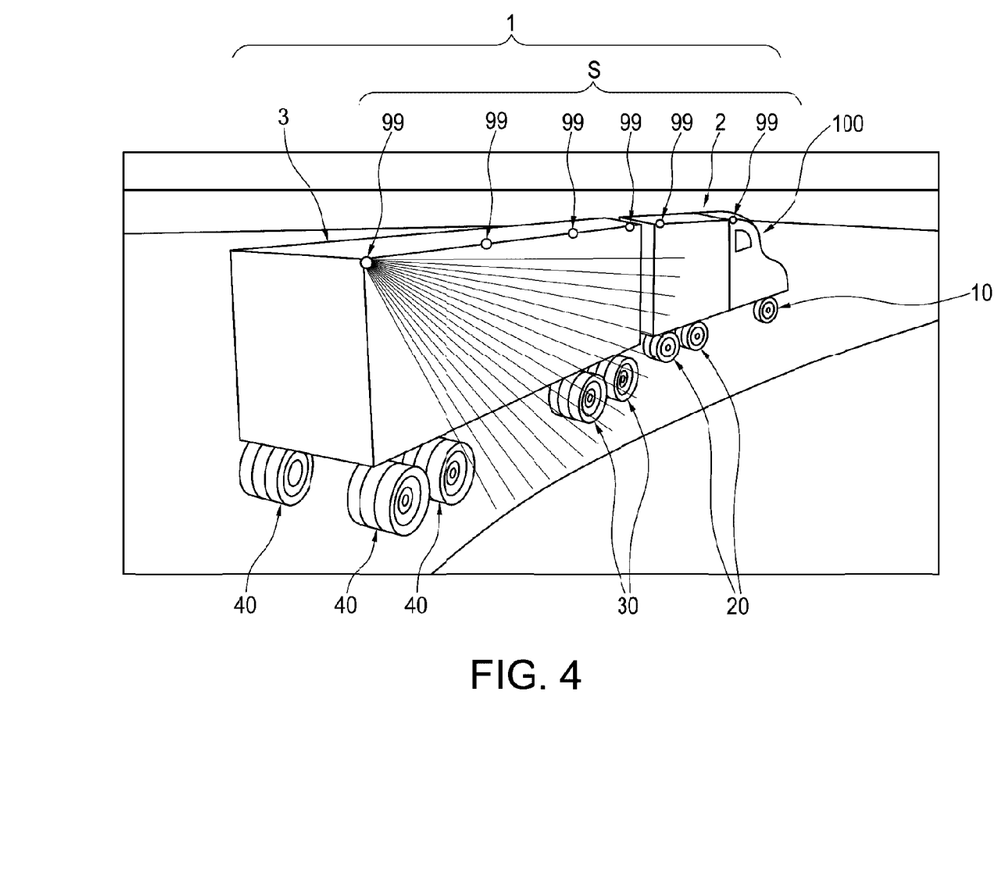

Referring now to FIG. 4, this schematic representation illustrates, in a perspective view, an articulable vehicle 100, such as an inland freight vehicle, according to another embodiment of the present invention which advantageously comprises a warning system. As depicted in FIG. 4, the articulable vehicle 100 comprises a tractor-trailer configuration 1 having a hitching structure (not shown), the tractor 2 of the tractor-trailer configuration 1 having a set of front wheels 10 and a set of rear wheels 20, the set of tractor front wheels 10 and the set of tractor rear wheels having a general path 11, the trailer 3 having a set of front wheels 30 and a set of rear wheels 40, the set of trailer front wheels 30 and the set of trailer rear wheels 40 having a general path 41, wherein the trailer general path 41 is not coincident with the tractor general path 11, wherein the trailer 3 is articulable in relation to the tractor 2 of the tractor-trailer configuration 1, as typically occurring in operation of the vehicle 100, especially during a turning manoeuvre, the articulating vehicle 100 implementing a warning system S which is desirably operable with a corresponding warning method M2 (see also FIG. 6), and whereby a dangerous condition may be desirably avoidable, in accordance with an embodiment of the present disclosure.

Still referring to FIG. 4, in such situations, a potentially conflicting obstacle 50, such as a pedestrian, may be present in an environment 60, such as an environment having a pavement, e.g., a corner of a sidewalk (see also FIGS. 1A-3), wherein the warning system S is operable to avoid endangering the obstacle 50, in accordance with embodiments of the present disclosure. In one such embodiment of the present disclosure, the warning system S comprises a plurality of warning devices 99 strategically disposed in relation to the vehicle 100 and/or any appurtenances thereof, wherein each warning device 99 comprises a light generator (not shown) for providing a visual alarm, especially during nightfall. In a further embodiment of the present disclosure, the warning device 99 further comprises a sound generator (not shown) for providing an audible alarm. In one such embodiment, the light generator emits at least one light beam 98 (see FIG. 3); and the sound generator emits at least one sound wave 97 (see FIG. 3).

Still referring to FIG. 4, in one embodiment of the present disclosure, the system S is operable, e.g., via at least one of processor (not shown), a controller (not shown), a factory programmed device (not shown), e.g., a programmable logic controller (PLC), by way of the set of executable instructions stored in the at least one storage device (not shown), such as a memory device, a volatile memory device, and a non-volatile memory device, the set of executable instructions comprising a set of algorithms, e.g., such as embodied in AutoTurn® software. In a particular embodiment, the at least one of a processor, controller, factory programmed device or PLC may be comprised in an application-specific processor or controller device such as an ASIC or other application-specific processing device as may be adapted for executing instructions such as software and/or firmware to implement aspects of the invention. In one embodiment of the present disclosure, the set of executable instructions comprises instructions for calculating the extent to which a vehicle 100 "should" travel in any direction for projecting an image on the at least one display device and for directing the optical and audio signal generator by way of the controller, including forward, reverse, and turning in both directions, in light of the extent to which the vehicle 100 "could" travel in relation to at least one of a stored parameter, a measured parameter, and any other received data, wherein the stored parameter comprises specifications and other information related to the vehicle 100, wherein the measured parameter comprises any real-time measurement taken by the at least one sensor, and wherein any other received data comprises data or real-time data regarding weather conditions, road conditions, and the like.

Referring back to FIGS. 3 and 4, in one embodiment of the present disclosure, the set of executable instructions comprises at least one instruction of: by way of at least one of a processor and a controller (not shown), instructing at least one camera to view a roadway in at least one possible travel, translating the roadway geometry into mathematical criteria, applying the set of algorithms, whereby prescribed travel data is generated, and displaying at least one image on the at least one display device, the at least one image representing prescribed travel data, the at least one image comprising a prescribed path which the vehicle should take in relation to the roadway in order to avoid collisions or other adverse ramifications, such as ground clearance obstacles under the vehicle 100, overhead clearance height obstacles, overhanging structural obstacles, inclement weather, traffic jams, other road accidents, and the like. In a further embodiment of the present disclosure, the warning system S also comprises a calibration feature that allows a user, e.g., a driver, to custom-calibrate a distance from the vehicle 100, e.g., a forward, rearward or sideways direction, for which the user desires the warning system to observe. In one embodiment of the present disclosure, the information is projected or displayed in some manner.

Still referring back to FIGS. 3 and 4, alternatively, in another embodiment of the present disclosure, the at least one display device (not shown) comprises a "heads-up" display, e.g., a display that is calibrated for the driver, wherein the "heads-up" display comprises a display disposable on a windshield, or even a feature for holographically rendering an image in, or on, at least one portion of the windshield, a light beam projection rendered on the roadway and/or the pavement, using a lighting system, whereby the center, right side, or left side of the vehicle 100 is mapped and provides guidance regarding the prescribed pathway for the driver to easily follow. The driver may then see an optimal path projected on his or her windscreen in a head-up display or heads-up display (HUD) such that he or she can more easily manoeuver the vehicle to an optimal path as mapped by the system S of the present disclosure. In another embodiment, the guidance input provided by the display device may comprise passive and/or active guidance control input for guiding the path of the vehicle 100 along the prescribed pathway.

Still referring back to FIGS. 3 and 4, in a further embodiment of the presently disclosed warning systems S having the travel recorder/analyzer, based on at least one predefined condition, such as a condition meeting a minimum off-tracking value or a condition of manual activation, at least one light projector of the plurality of light projectors emits light beam(s). In one such embodiment of the present disclosure, each light projector is configured to project at least one individual light ray on an area of the roadway or pavement between the projected trajectory path and a defined area for extended safety. Each light projector is further configured to project trajectories in response to either a pre-set value or are automatically adjusted for a distance forward or rearward of the tracking point if the vehicle 100 is moving forward or a distance aft of the tracking point if the vehicle 100 is moving in reverse. In one embodiment of the present disclosure, the distance encompasses a typical forward distance comprising a distance in a range of approximately one vehicle length or a predefined distance forward in relation to the front of the vehicle 100 or a predefined distance aft in relation to the rear of the vehicle 100.

Still referring to FIGS. 3-4, in another alternative embodiment of the present disclosure, the set of executable instructions comprises a set of algorithms for providing intelligent driving instructions, wherein a combination of LIDAR or other suitable remote sensing technique and CAD techniques are employed, wherein LIDAR or other suitable remote sensing techniques are employed for sensing environmental features, and wherein CAD techniques are employed on the basis of LIDAR and/or other remote sensing results for generating objects on the at least one display device), whereby a prescribed optimum pathway is provided, e.g., as data and/or an image on a display device, e.g., the heads-up display or for use in an automatic vehicle self-guidance system. In an alternative embodiment, remote sensing techniques may include at least one of photogrammetry and/or stereo-photogrammetry or other suitable remote sensing technique. In yet another alternative embodiment of the warning system, the set of executable instructions comprises instructions for rendering at least one image corresponding to a traffic sign, such as a "YIELD" sign and a "STOP" sign, at an appropriate time. In yet still another embodiment, the set of executable instructions comprises instructions for providing at least one warning signal, such as a flashing light, a video displaying a potentially conflicting environmental object, e.g., a low bridge, or subject, e.g., a pedestrian. Also, the present disclosure contemplates that the processor and/or controller is further adapted to receive data being streamed from any global positioning system database and any electronic news media source for providing the driver with ample warning regarding potentially conflicting environmental objects or conditions and that the set of executable instructions comprise instructions for providing at least one warning signal in relation thereto.

Still referring to FIGS. 3-4, in one embodiment of the present disclosure, the system S comprises at least one rotatable optical and audio signal generator, such as a laser, any type of lighting device, or any device for providing a physical indication, for indicating an extent of a path that a vehicle 100, such as an articulating vehicle, is likely to take as the vehicle 100 moves forward or rearward or executes a manoeuvre, such as turning or curving. Potential physical conflicts are thereby reported to a driver for avoiding potential accidents. The audio signal or sound may comprise a range of frequencies including those not detectable by humans in order to warn and or scare away animals, and the audio signal may vary in a warbling or other manner including variations in decibel strength. Variable pitch and tone may also be employed. Additionally, a warning to road users may be emitted from the vehicle by means of a water spray to warn road users that they are in the path of the approaching vehicle.

Still referring to FIGS. 3-4, in another embodiment of the present disclosure, the system S comprises at least one display device (not shown), such as a display screen, any type of lighting device, or any device for providing a physical indication, for indicating an extent of a path that a vehicle 100, such as an articulating vehicle, is likely to take as the vehicle moves forward or rearward or executes a manoeuvre, such as turning or curving. For instance, the display screen is adapted to project an extent of a path that a vehicle 100, such as an articulating vehicle, is likely to take as the vehicle 100 executes a forward manoeuvre and a reverse manoeuvre.

Still referring to FIGS. 3-4, in another exemplary embodiment contemplated by the present disclosure is a system S comprising at least one display device (not shown) adapted to provide guidance to the driver via a screen projection or a projection of guidance light on a pavement of a path that a driver should take to avoid a physical conflict or to manoeuvre through a particular course, e.g., by way of a HUD or any transparent display that presents data without requiring a driver to look away from their usual perspective. In yet another exemplary embodiment, the present disclosure encompasses a warning system S comprising a guidance and active or passive control system (not shown) for facilitating steering the vehicle 100, e.g., by means of input by the driver, and/or automatically, to execute such manoeuvres. Potential physical conflicts are thereby avoidable.

Still referring to FIGS. 3-4, in yet another embodiment of the present disclosure, the system S comprises a feature for projecting safety indication images on the pavement that warns/informs drivers by providing a visual indication of boundaries for a prescribed pathway or for recommending stopping altogether such as for ensuring safe execution of an over-steer manoeuvre, or for stopping short of or avoiding a ground clearance obstacle under the vehicle 100, or an overhead clearance obstacle or overhanging structural obstacle. For example, the present disclosure contemplates a laser that provides visual indication "painted" on either side of a truck to warn of a "turning manoeuver," e.g., a left turn followed by a right. In yet another embodiment of the present disclosure, the system comprises a feature for analyzing the road in advance of the vehicle 100, e.g., while in motion (in real-time as well), and by way of a software analysis according to an embodiment of the present disclosure, such as a software analysis using "AutoTURN® Pro 3D" software, whereby a prediction is determinable as to whether a vehicle 100 will strike a structure such as an overhead or overhanging structure, the ground surface under the vehicle 100 such as a ground clearance obstacle, an object, or other appurtenance for facilitating transmitting a warning signal and/or for providing active or passive guidance control input to the driver or a vehicle control system.

Figure 5:
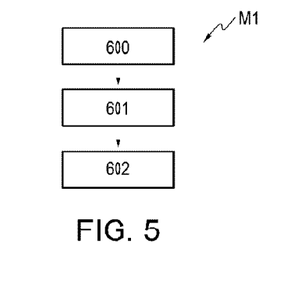
FIG. 5 is a flow diagram illustrating a method of fabricating a warning system, in accordance with an embodiment of the present disclosure.

Referring now to FIG. 5, one embodiment, according to the present disclosure, generally involves a method M1 of fabricating a warning system S (see warning system S as depicted and described in reference to FIGS. 3-4 above). In one such embodiment, the method M1 comprises: providing at least one sensor disposable in relation to a vehicle 100 and capable of detecting information relating to at least one vehicle parameter and at least one object within a projectable area, as indicated by block 600; providing at least one rotatable optical and audio signal generator disposable in relation to the vehicle 100 and capable of emitting and projecting at least one optical and audio signal in relation to the at least one object within the projectable area, as indicated by block 601; and providing at least one of a processor and a controller disposable in relation to the vehicle 100 and capable of receiving feedback from the at least one sensor and of instructing the at least one rotatable optical and audio signal generator based on the feedback while the vehicle 100 is in motion, as indicated by block 602. The painting of a danger area by at least one of a visual or audio medium may optimally commence shortly after the vehicle enters the turn, such that adequate parameters of the vehicle and the angle of turn are received and computed by the algorithm such that the predicted path can then be projected onto a road surface.

Still referring to FIG. 5, in the fabrication method M1 according to one embodiment of the present disclosure, providing at least one sensor providing 600 comprises providing the at least one sensor capable of detecting information comprising data relating to the at least one vehicle parameter and the at least one object within the projectable area. In a further embodiment of the present disclosure, providing the at least one optical and audio signal generator 602 comprises providing at least one optical and audio signal generator capable of generating the at least one optical and audio signal as at least one optical and audio beam. In another embodiment of the present disclosure, providing at least one optical and audio signal generator 602 comprises providing the at least one optical and audio signal generator capable of generating the at least one optical and audio beam as at least one of a laser signal and a radar signal.

Still referring to FIG. 5, in yet a further embodiment of the present disclosure, the fabrication method M1 further comprises at least one of: providing at least one storage device disposable in relation to the vehicle 100 and capable of storing the information relating to the at least one vehicle parameter and the at least one object within a projectable area; and providing at least one display device disposable in relation to the vehicle 100 and capable of providing at least a portion of the information by way of displaying at least one image on a display screen. In a further embodiment of the present disclosure, the step of providing the at least one display device comprises providing the at least one display device as communicable with the processor or controller for providing user-friendly feedback to the driver, the at least one display device providing comprising providing at least one graphic user interface (GUI). In yet a further embodiment of the present disclosure, the step of providing the at least one optical and audio signal generator comprises providing a series of lighting devices, such as at least one of a laser, a light-emitting diode (LED), and the like, adapted to project light onto a pavement based on algorithms that predict or recommend a vehicle 100 path.

Figure 6:
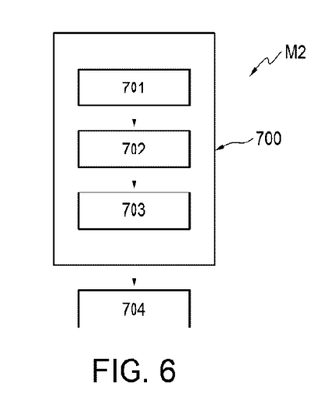
FIG. 6 is a flow diagram illustrating a method of a warning, in accordance with an embodiment of the present disclosure.

Referring now to FIG. 6, one embodiment of the present disclosure generally involves a method M2 of warning at least one of traffic and pedestrians by way of a warning system S (see warning system S as depicted and described in reference to FIGS. 3-4 above). In one such embodiment, the method M2, comprises: providing a warning system S, as indicated by block 700, the warning system S providing 700 comprising: providing at least one sensor disposable in relation to a vehicle 100 and capable of detecting information relating to at least one vehicle parameter and at least one object, such as at least one potential obstacle 50, within a projectable area, such as an environment 60, as indicated by block 701; providing at least one rotatable optical and audio signal generator disposable in relation to the vehicle 100 and capable of emitting and projecting at least one optical and audio signal, such as a light beam 98 (see FIG. 3), in relation to the at least one object, such as the at least one potential obstacle 50, within the projectable area, such as an immediate danger area D (see FIG. 3) and a potential danger zone Z (see FIG. 3), as indicated by block 702; and providing at least one of a processor and a controller disposable in relation to the vehicle 100 and capable of receiving feedback from the at least one sensor and of instructing the at least one rotatable optical and audio signal generator based on the feedback while the vehicle 100 is in motion, as indicated by block 703; and activating the warning system S (FIGS. 3-4), as indicated by block 704. In one such embodiment of the present disclosure, the audio signal or sound may comprise a range of frequencies including those not detectable by humans in order to warn and or scare away animals, and the audio signal may vary in a warbling or other manner including variations in decibel strength.

Still referring to FIG. 6, in one embodiment of the present disclosure, the method M2 for providing the warning system 700 further comprises: providing at least one storage device disposable in relation to the vehicle 100 and capable of storing the information relating to the at least one vehicle parameter and the at least one object within the projectable area; and storing the information relating to the at least one vehicle parameter and the at least one object within the projectable area. In one such embodiment, the warning system providing 700 further comprises: providing at least one display device disposable in relation to the vehicle 100 and capable of providing at least one portion of the information by way of displaying at least one image on a display screen; and providing the at least one portion of the information by way of displaying the at least one image on the display screen. In another embodiment, providing the warning system 700 comprises providing at least one of installing and retrofitting the warning system in relation to the vehicle 100 comprising an articulated vehicle. The step of providing the at least one display device comprises providing the at least one display device as communicable with the processor or controller for providing user-friendly feedback to the driver, the at least one display device providing comprising providing at least one graphic user interface (GUI). In a further embodiment, the warning method M2 further comprises providing user-friendly feedback to the driver by way of the at least one display device. In one such embodiment, the feedback provided to the driver may comprise active and/or passive guidance control input such as for enabling driver assisted or automatic vehicle guidance control for guiding the vehicle 100 to avoid a hazardous situation. Alternatively, instead of projecting a light onto the roadway or pavement, the present disclosure encompasses deploying a physical object, such as a flexible flag device, from the vehicle 100.

Still referring to FIG. 6, in one embodiment of the present disclosure, the warning method M2 further comprises initiating the warning system as a turning manoeuvre commences, wherein the initiating step comprises at least one of: determining whether the turning manoeuvre commences by determining whether a steering exceeds an angular threshold value, e.g., of approximately of 5 degrees, determining forward or rearward travel commences by determining whether an acceleration, etc., exceeds an acceleration threshold value, and wherein the initiating step is performable in one manner of automatically by a feedback and control device and manually initiated by the driver or a passenger. Optionally, the initiating step is performable throughout operation of the vehicle 100, e.g., wherein the warning system is constantly making the foregoing determinations. In one embodiment, the laser beam "marking" is generated by obtaining input from a data source identifying (predicting) the extreme pathway boundaries that the vehicle 100 and/or its load would take. For example, by detecting a steering direction, the source of data that would feed the lasers would come from an algorithm, such as an Auto-TURN® software algorithm or the like, capable of predicting the vehicle's position if the steering is maintained in a fixed disposition and constantly (e.g., in real-time) recalculating the extremities of the vehicle's path as the steering is changed. In the latter case, the projection of the light beams on the ground is constantly adjustable. In one embodiment, the laser beams map a grid or trace curved lines, thereby providing a projection of the vehicle's predicted path in advance of its instantaneous position on the roadway as well as a projection of any adjacent areas of concern in relation to any potential obstacles (including moving obstacles and/or stationary obstacles such as ground clearance obstacles under the vehicle 100, or overhead or overhanging structural obstacles) perceived by the warning system.

Still referring to FIG. 6, in one embodiment according to the present disclosure directed to the warning systems having the travel recorder/analyzer, the warning method comprises: sensing environmental data by utilizing at least one of LIDAR data and GPS 3D data during vehicle travel; automatically transmitting steering readings to the travel recorder/analyzer; calculating a trajectory of a desired tracking point, e.g., rear extremities of the vehicle 100 or any other tracking point based on the instantaneous disposition of the vehicle 100; calculating a light projector angle for each light projector that traces the tracking point, emitting a light beam at the calculated angle and sensing whether a potential conflict exists; and determining whether an off-tracking is less than a threshold value and if not, then repeating sensing environmental data, and if so, then automatically deactivating the warning system. Off-tracking, as known in the art, is the distance between pairs of wheel paths on a turning vehicle.

Other features of the warning systems and methods, as encompassed by further embodiments according to the present disclosure, include, but are not limited to, generating warning sounds or audio signals in addition to visual warnings via the GUI, e.g., for providing a warning sound corresponding to viewing the track of the vehicle's path during execution of a turning manoeuvre, as well as for providing audio and/or visual feedback corresponding to potential conflicts, e.g., noise and the like emanating from a source of potential conflict. In this manner the user or operator can receive information in the cab of the vehicle showing potential conflicts and/or passive guidance control input early in a manoeuver so action to avoid an accident can be taken. The warning systems and methods according to embodiments of the present disclosure further involve providing active guidance control input such as to enable automatic or intelligent braking or automatic or intelligent diverting of the vehicle to avoid a potential conflict.

Yet other features of the warning systems and methods according to embodiments of the present disclosure, include, but are not limited to, generating a representation of the predicted vehicle "off-tracking" extents from a vehicle on the road for warning other road users as well. In one such embodiment, the representation generating comprises calibrating the warning system to predict the off-tracking extents based on a variety of parameters. In another embodiment, the warning system receives road terrain information from a plurality of different sources. In a further embodiment, the warning system receives a signal from the driver for initiating operation by the vehicle experiencing a travel, e.g., commences turning, the warning system is adapted to predict and display at least one of the outermost tire track path and the outermost vehicle body path through a plurality of light beams emitted from at least one light source, such as a laser light source, an LED source, and a light reflection device.

For predicting the off-tracking extents, the variety of vehicle parameters (derivable from at least a vehicle's specifications), such as a maximum steering angle, vehicle dimensions, including articulation points and wheelbase data, and any other relevant data, may be utilized for calculating locations (x, y, z directions) on the roadway for which light projections are to be generated. In one such embodiment, the warning system further comprises a plurality of light projectors, such as lasers and LED sources, etc., disposed in a plurality of locations in relation to at least one of the vehicle body and any appurtenance thereof. Each component of the plurality of light projectors comprises a feature for calibrating the light source, wherein calibration of each light projector is independently performable in at least one manner of: automatically, manually, in response to light emission of any other light projector of the plurality of light projectors, depending on the location of the projector(s) on the associated with the body, in response to a vehicle vibration, among other manners, for maintaining accurate overall light beam projection.

Another feature of warning systems and methods according to an embodiment of the present disclosure comprises a "black box" or travel recorder/analyzer adapted to calculate the vehicle's projected trajectory or pathway based on at least the above vehicle parameters. The method of warning comprises determining whether the vehicle's projected trajectory produces off-tracking offsets that are significant, such as by the operator, other person, or other criteria, e.g., by a set of executable instructions, and, if so, then at least one light projector of the plurality of light projectors is activated, and if not, then operator proceeds with driving the vehicle, and, if needed, the step of determining whether the vehicle's projected trajectory produces off-tracking offsets that are significant is repeated.

In addition to visual warning systems such as light beams for road users, warning systems according to an embodiment of the disclosure may further comprise any suitable warning system to pedestrians such as automatically sounding the vehicle horn or an auxiliary horn or sound device, or audio signal, or alternatively, more intrusive mechanisms like preventing the vehicle from turning, may be employed.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments are hereby expressly incorporated by reference and are intended to be encompassed by the present claims.

Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, are also encompassed by the present disclosure.

INDUSTRIAL APPLICABILITY

The present disclosure industrially applies to traffic warning systems and methods. More specifically, the present disclosure industrially applies to traffic and pedestrian warning systems and methods for use in relation to a forward, rearward, or turning, path of a vehicle. Even more specifically, the present disclosure industrially applies to traffic and pedestrian warning systems and methods having optical and audio feedback and control for use in relation to a forward, rearward or turning, path of a vehicle. Other industrial applications include, but are not limited to, facilitating marine navigation at port, aircraft navigation at airports, and inland freightliner navigation at docks and in transit.

What is claimed is:
1. A warning system, comprising:
at least one sensor disposable in relation to a vehicle for detecting information relating to vehicle motion and at least one object within a projectable area;
at least one signal generator disposable in relation to the vehicle for emitting and projecting at least one signal in relation to the at least one object within the projectable area; and
a controller disposable in relation to the vehicle and implementing executable instructions, for receiving at least one vehicle parameter including vehicle wheel- base dimensions and feedback from the at least one sensor and instructing the at least one signal generator based on the feedback while the vehicle is in motion, the controller predicting a pathway of the vehicle in relation to an instantaneous disposition of the vehicle in advance of the vehicle's travel, including off tracking information, and an instantaneous disposition of the object in relation to the predicted vehicle pathway, whereby an advance warning is providable.

2. The system of claim 1, further comprising at least one storage device disposable in relation to the vehicle and capable of storing the information relating to the at least one vehicle parameter and the at least one object within the projectable area.

3. The system of claim 1, further comprising at least one display device disposable in relation to the vehicle and capable of providing at least one portion of the information by way of displaying at least one image on a display screen.

4. The system of claim 1, wherein the information comprises data relating to the at least one vehicle parameter and the at least one object within the projectable area.

5. The system of claim 1, wherein the vehicle comprises an articulated vehicle and wherein the at least one vehicle parameter further includes a vehicle articulation point.

6. The system of claim 5, wherein the articulated vehicle comprises at least one of a tractor-trailer, a multi-segment bus, a train, a subterranean train, an elevated train, a vehicle towing a trailer, a tractor towing a plane, a tram, and a vehicle towing another vehicle.

7. The system of claim 1, wherein the at least one signal comprises at least one optical or audio beam.

8. The system of claim 7, wherein the at least one optical beam comprises at least one of a laser signal and a radar signal.

9. The system of claim 1, further comprising:
at least one storage unit disposable in relation to the vehicle and capable of storing the information relating to the at least one vehicle parameter and the at least one object within a projectable area; and
at least one display device disposable in relation to the vehicle and capable of providing at least a portion of the information by way of displaying at least one image on a display screen,
wherein the information comprises data relating to the at least one vehicle parameter and the at least one object within the projectable area,
wherein the vehicle comprises an articulated vehicle,
wherein the articulated vehicle comprises at least one of a tractor-trailer, a multi-segment bus, a train, a vehicle towing a trailer, and a vehicle towing another vehicle,
wherein the at least one optical signal comprises at least one optical beam, and
wherein the at least one optical beam comprises at least one of a laser signal and a radar signal.

10. A method of providing a warning system for a vehicle, comprising:
providing at least one sensor disposable in relation to a vehicle for detecting information relating to vehicle position and at least one object within a projectable area;
providing at least one optical signal generator disposable in relation to the vehicle for emitting and projecting at least one optical signal in relation to the at least one object within the projectable area; and
providing a controller disposable in relation to the vehicle for receiving at least one vehicle parameter including vehicle wheelbase dimensions and feedback from the at least one sensor and of instructing the at least one signal generator based on the feedback while the vehicle is in motion, and predicting a pathway of the vehicle in relation to an instantaneous disposition of the vehicle in advance of the vehicle's travel, including off tracking information, and an instantaneous disposition of the object in relation to the predicted vehicle pathway, whereby an advance warning is providable.

11. The method of claim 10, further comprising providing at least one storage device disposable in relation to the vehicle and capable of storing the information relating to the at least one vehicle parameter and the at least one object within a projectable area.

12. The method of claim 10, further comprising providing at least one display device disposable in relation to the vehicle and capable of providing at least a portion of the information by way of displaying at least one image on a display screen.

13. The method of claim 10, wherein the at least one sensor providing comprises providing the at least one sensor capable of detecting information comprising data relating to the at least one vehicle parameter and the at least one object within the projectable area.

14. The method of claim 10, wherein the at least one signal generator is one of an optical, audio or olfactory signal generator and comprises providing the at least one optical signal generator capable of generating the at least one optical signal as at least one of an optical beam or sound.

15. The method of claim 14, wherein providing the at least one optical signal generator comprises providing the at least one optical signal generator capable of generating at least one optical beam as at least one of a laser signal and a radar signal.

16. The method of claim 10, further comprising:
providing at least one storage device disposable in relation to the vehicle and capable of storing the information relating to the at least one vehicle parameter and the at least one object within a projectable area; and
providing at least one display device disposable in relation to the vehicle and capable of providing at least a portion of the information by way of displaying at least one image on a display screen,
wherein the at least one sensor providing comprises providing the at least one sensor capable of detecting information comprising data relating to the at least one vehicle parameter and the at least one object within the projectable area,
wherein the at least one optical signal generator providing comprises providing the at least one optical signal generator capable of generating the at least one optical signal as at least one optical beam, and
wherein the at least one optical signal generator providing comprises providing the at least one optical signal generator capable of generating the at least one optical beam as at least one of a laser signal and a radar signal.

17. A method of warning at least one of traffic, a pedestrian, and a driver by way of a warning system, comprising:
providing a warning system, the warning system comprising:
at least one sensor disposable in relation to a vehicle for detecting information relating to vehicle position and at least one object within an area of interest;
at least one optical signal generator disposable in relation to the vehicle for emitting and projecting at least one optical signal in relation to the at least one object within the projectable area; and a controller disposable in relation to the vehicle for receiving at least one vehicle parameter including vehicle wheelbase dimensions and feedback from the at least one sensor and instructing the at least one optical signal generator based on the feedback while the vehicle is in motion, and predicting a pathway of the vehicle in relation to an instantaneous disposition of the vehicle in advance of the vehicle's travel, including off tracking information, and an instantaneous disposition of the object in relation to the predicted vehicle pathway, whereby an advance warning is providable; and activating the warning system, thereby providing advance warning.

18. The method of claim 17, wherein the warning system providing further comprises:

providing at least one storage device disposable in relation to the vehicle and capable of storing the information relating to the at least one vehicle parameter and the at least one object within the projectable area; and storing the information relating to the at least one vehicle parameter and the at least one object within the projectable area.

19. The method of claim 17, wherein the warning system further comprises:

at least one display device disposable in relation to the vehicle and capable of providing at least one portion of the information by way of displaying at least one image on a display screen.

20. The method of claim 17, wherein providing the warning system additionally comprises at least one of installing and retrofitting the warning system in relation to the vehicle, wherein the vehicle comprises an articulated vehicle.

* * * * *

UNITED STATES PATENT AND TRADEMARK OFFICE
CERTIFICATE OF CORRECTION

| | | |
|---|---|---|
| PATENT NO. | : 10,446,021 B2 | Page 1 of 1 |
| APPLICATION NO. | : 15/327514 | |
| DATED | : October 15, 2019 | |
| INVENTOR(S) | : Milton Carrasco, Steven Kin Shing Cheng and Steven Chi Kit Chan | |

It is certified that error appears in the above-identified patent and that said Letters Patent is hereby corrected as shown below:

On the Title Page

Item (73) Assignee should read:
--TRANSOFT TECHNOLOGIES INC., Richmond (CA)--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*